United States Patent [19]
Foladare et al.

[11] Patent Number: 5,978,837
[45] Date of Patent: *Nov. 2, 1999

[54] INTELLIGENT PAGER FOR REMOTELY MANAGING E-MAIL MESSAGES

[75] Inventors: Mark Jeffrey Foladare, Kendall Park; Shelley B. Goldman, East Brunswick; David Phillip Silverman, Somerville; Roy Philip Weber, Bridgewater; Robert S. Westrich, Middletown, all of N.J.

[73] Assignee: AT&T Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/720,127

[22] Filed: Sep. 27, 1996

[51] Int. Cl.⁶ .............................. H04Q 7/00; G08B 5/22
[52] U.S. Cl. ...................................... 709/207; 340/825.27
[58] Field of Search .................. 395/200.36, 200.37, 395/200.48, 200.68, 200.7, 200.74, 200.62, 200.57; 340/825.44, 825.26, 825.27; 370/352, 313, 314; 455/31.2, 31.3; 379/93.24, 100.08, 100.09; 358/400

[56] References Cited

U.S. PATENT DOCUMENTS

| | | | |
|---|---|---|---|
| 5,283,856 | 2/1994 | Gross et al. | 395/51 |
| 5,377,354 | 12/1994 | Scannell et al. | 395/673 |
| 5,398,021 | 3/1995 | Moore | 340/825.27 |
| 5,404,231 | 4/1995 | Bloomfield | 358/400 |
| 5,487,100 | 1/1996 | Kane | 379/57 |
| 5,548,814 | 8/1996 | Lorang et al. | 340/825.44 |
| 5,555,426 | 9/1996 | Johnson et al. | 395/200.36 |
| 5,608,606 | 3/1997 | Blaney . | |
| 5,619,648 | 4/1997 | Canale et al. | 395/200.36 |
| 5,648,990 | 7/1997 | Kraul et al. | 375/316 |
| 5,689,642 | 11/1997 | Harkins et al. | 395/200.37 |
| 5,689,654 | 11/1997 | Kikinis et al. | 395/281 |
| 5,694,616 | 12/1997 | Johnson et al. | 395/200.37 |
| 5,706,211 | 1/1998 | Beletic et al. | 364/514 |
| 5,758,088 | 5/1998 | Bezaire et al. | 395/200.62 |
| 5,771,353 | 6/1998 | Eggleston et al. | 395/200.57 |
| 5,793,301 | 8/1998 | Patterson, Jr. et al. | 340/825.26 |
| 5,822,527 | 10/1998 | Post | 395/200.36 |
| 5,857,179 | 1/1999 | Vaithyanathan et al. . | |

OTHER PUBLICATIONS

Gliedman, John; "Indexing the easy way—Indexation 2.0 for Microsoft Word 7.0", "Computer Shopper", Ziff–Davis Publishers, Oct. 1996, v16, n10, p. 399(2).

Primary Examiner—Mark H. Rinehart
Assistant Examiner—Marc D Thompson
Attorney, Agent, or Firm—Jose R. de la Rosa

[57] ABSTRACT

An intelligent pager remotely manages an E-Mail server that receives E-Mail messages transmitted over an E-Mail network. Useful E-Mail messages can be identified by the pager and separated from the junk mail. The pager remotely controls the server to forward messages as directed by the recipient. The E-Mail server sends a summary of the E-Mail message to the pager over a different network so that the pager can select a forwarding destination for the message. The pager sends a selection signal to the E-mail server which then forwards the E-Mail message to the selected destination. The E-Mail message can be forwarded by the server over another network, such as the public telephone network, to a computer or a FAX machine at the recipient's office, home or other destination.

4 Claims, 7 Drawing Sheets

INTELLIGENT PAGER FOR REMOTELY MANAGING E-MAIL MESSAGES

CROSS-REFERENCE TO RELATED APPLICATIONS

This application is related to the co-pending patent application entitled "E-Mail Paging System" by Foladare, et al. filed on the same day as this application, and incorporated herein by reference.

BACKGROUND OF THE INVENTION

1. Field of the Invention

The invention disclosed broadly relates to communications systems and more particularly relates to a method and system for remotely managing an E-Mail server.

2. Description of the Related Art

Electronic mail, commonly referred to as E-Mail, may be simple text messages containing only ASCII characters, or it may be complex messages containing embedded voice messages, spreadsheets, and images. E-Mail messages can be transmitted over a short-haul link such as a local area network or they can be transmitted over intercontinental networks. The National Science Foundation's TCP/IP-based network (NSFNET) forms a backbone network that links supercomputing centers and over 2500 academic and scientific institutions around the world. Many private organizations have become communications service providers by connecting their subsidiary networks to the NSFNET. This composite network is popularly called the internet and it has become the primary medium for the transmission of E-Mail messages. Many members of the public have obtained subscriptions from internet service providers, have connected their personal computers to the service, and now exchange a large volume of E-Mail messages. The ease of sending E-Mail messages on the internet has created a significant amount of junk electronic mail that is indiscriminately downloaded into the recipient's personal computer. Valuable time is wasted by recipients who must winnow through unsolicited junk mail messages to find useful E-Mail relevant to their personal interests.

SUMMARY OF THE INVENTION

In accordance with the invention, the recipient's computer automatically makes some of the E-Mail forwarding selections for the recipient. The recipient's computer includes a local database of sender records for those senders whose messages are considered important to the recipient. A control program in the recipient's computer automatically reviews the title or message summary in an alert signal from the E-Mail server and automatically sends to the E-Mail server a selection signal designating a selected forwarding destination to send the E-Mail message. Each sender record includes a priority word list of words that the recipient considers important in any messages sent by that particular sender. The recipient's computer includes a priority word comparison program to compare the words received in the alert signal with the words in the priority word list in the sender's record. If there is no match with a priority word, then the recipient's computer sends a selection signal to the server with a pre-selected default choice for the forwarding destination. However, if there is a match with a priority word, then the recipient's computer selects a first destination choice from the sender's record to send in the selection signal to the E-Mail server.

In a further embodiment of the invention, if there is a match and an additional alarm value is present in the sender's record, then the computer uses its pager card to send an alert signal to the recipient's mobile pager. In this manner, the recipient can manually make the forwarding selection for particularly important E-Mail messages.

In an alternate embodiment of the invention, the recipient's mobile pager or personal communications device carried by the recipient automatically makes some of the E-Mail forwarding selections for the recipient. The recipient's mobile pager or personal communications device includes a local database of the sender records described above for those senders whose messages are considered important to the recipient. A control program in the recipient's mobile pager or personal communications device automatically reviews the title or message summary in an alert signal from the E-Mail server and automatically sends to the E-Mail server a selection signal designating a selected forwarding destination to send the E-Mail message. The recipient's mobile pager or personal communications device includes a priority word comparison program to compare the words received in the alert signal with the words in the priority word list in the sender's record. If there is no match with a priority word, then the recipient's mobile pager or personal communications device sends a selection signal to the server with a pre-selected default choice for the forwarding destination. However, if there is a match with a priority word, then the recipient's mobile pager or personal communications device selects a first destination choice from the sender's record to send in the selection signal to the E-Mail server. If there is a match and an additional alarm value is present in the sender's record, then the recipient's mobile pager or personal communications device sounds an audible alarm to alert the recipient. The recipient can then manually make the forwarding selection for particularly important E-Mail messages.

DESCRIPTION OF THE PREFERRED EMBODIMENT

Figure 1:
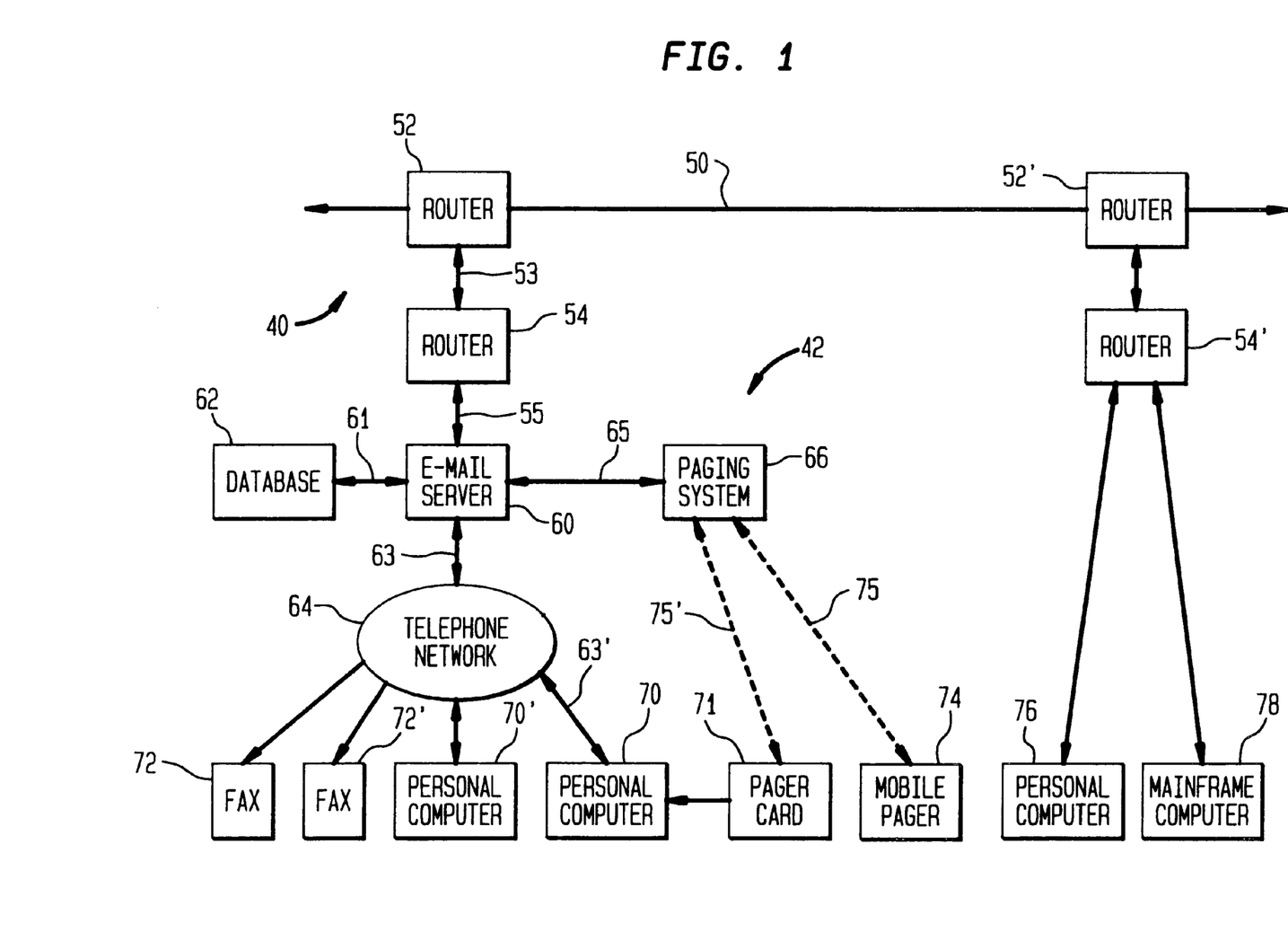
FIG. 1 shows the E-Mail network 40, the paging network 42, and the telephone network 64 connected to the E-Mail server 60.

FIG. 1 shows the E-Mail network 40, the paging network 42, and the telephone network 64 connected to the E-Mail server 60. An E-Mail message entitled "Meeting Notice" is prepared at the personal computer 76 or the mainframe computer 78 by a sender named "S. Smith" and is addressed to "Recipient_A". The message is sent to the E-Mail network 40 which includes the router 54', router 52', and the NSFNET backbone network 50. The E-Mail message has a network routing address, for example a domain-based address "RECIPIENT_A @ COMPANY_C.COM". The E-Mail network 40 appends to the E-Mail message a unique message ID such as the string "ssmith-76-0930-091296" consisting of the sender's ID, the sender's network node ID, the time of day, and the date. The E-Mail network 40 routes the E-Mail message over the backbone network 50, the router 52, and the router 54 over path 53 to the E-Mail server 60 over path 55. The E-Mail server 60 buffers the E-Mail message while it waits for the recipient to select a forwarding destination for the message. Details of the E-Mail Server 60 can be found in the co-pending patent application cited above.

Figure 2A:
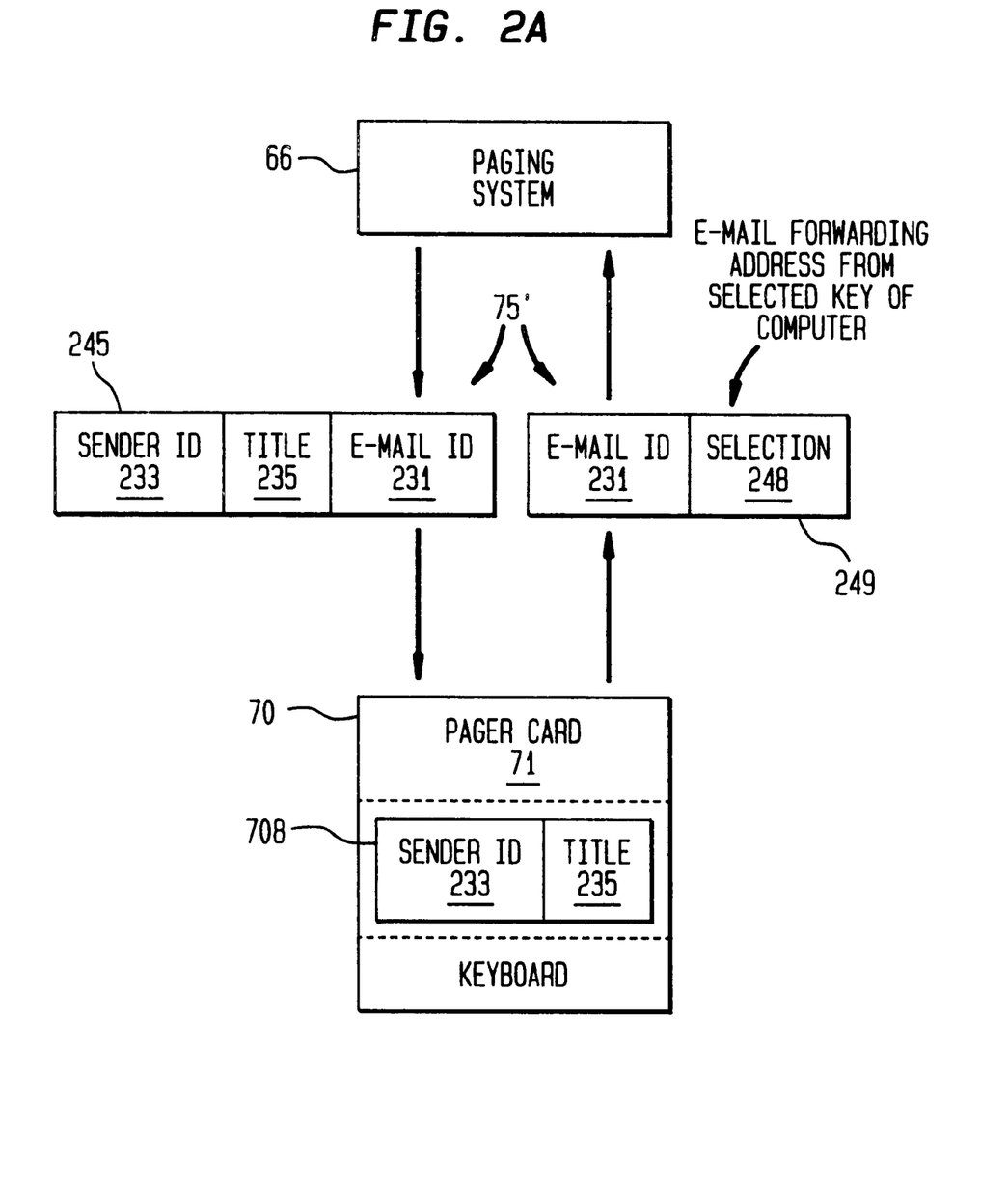
FIGS. 2A and 2B show an example of the alert signal 245 and the selection signal 249 for the computer 70 and the mobile pager 74, respectively.
Figure 2B:
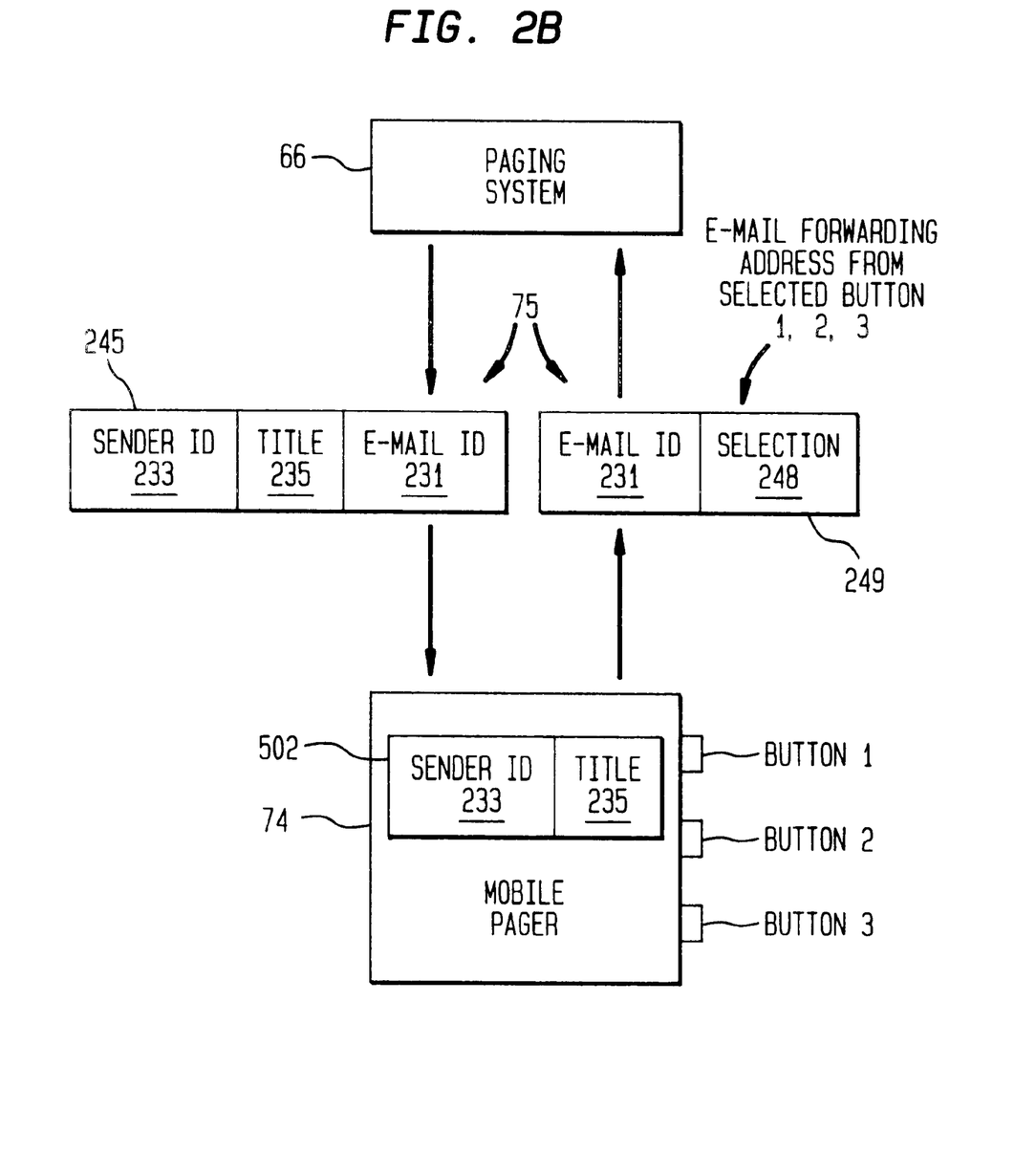

FIGS. 2A and 2B show an example of the alert signal 245 which includes the sender ID 233 "S. Smith", the title 235 of the E-Mail message "Meeting Notice", and the E-Mail message ID 231 "ssmith-76-0930-091296". The recipient can view the summary of the E-Mail message on the display 708 of the computer 70 in FIG. 2A or on the display 502 of the mobile pager 74 in FIG. 2B and can select a forwarding destination for the E-Mail message using the keyboard or the buttons 1, 2, or 3, respectively. A selection signal 249 is sent over the radio link to the paging system 66 of the paging network 42. The selection signal 249 includes the selection value 248 which is transferred over line 65 to the E-Mail server 60. The E-mail server 60 then forwards the E-Mail message to the selected destination. The E-Mail message can be forwarded by the server 60 over another network, such as the public telephone network 64, to a selected computer 70 or 70' or to a selected FAX machine 72 or 72' at the recipient's office, home, or other destination.

The wireless network 42 may alternately be a personal communications system (PCS) wireless network that communicates the alert signal to a personal communications device carried by the recipient. The mobile pager transceiver 74 or personal communications device has a display 502 shown in FIG. 2B, upon which the recipient can view the sender's name and the title of the message or a summary of the message. Recipient_A sees that it is his boss, S. Smith, who has sent him an E-Mail message with the title "Meeting Notice". The recipient can use buttons or keys 1, 2, or 3 on the mobile pager 74 or personal communications device to select where the server should forward the E-Mail message. The mobile pager 74 or personal communications device then sends the selection signal 249 with the recipient's choice selection 248 over the wireless network 42 to the server 60 to forward the message to one of several destinations.

In another embodiment, referred to here as the PC pager card alarm mode, the server 60 transmits an alert signal 245' over the wireless paging network 42 directly to the pager card 71 attached to the recipient's personal computer 70. Continuing with the example of the Recipient_A, it begins to rain on his golf game and Recipient_A decides to return to the office. He uses his personal computer 70 at his office to send a mode setting command over the telephone network 64 to the server 60, to set the alarm mode to "PC pager card alarm". When another E-Mail message to Recipient_A arrives at the server 60 from sender J. Jones, the server 60 proceeds to send the alert signal 245' to the recipient's PC pager card 71 connected to his personal computer 70 using the PC pager card address. The recipient can view the sender's name and the title of the message or a summary of the message which is displayed on the computer 70 and can send a selection signal 249' to the server 60 to forward the message to one of several destinations. The E-Mail message can be forwarded over the public telephone network, or over the E-Mail network, or over another network such as the wireless paging network to the selected destination.

Figure 3:
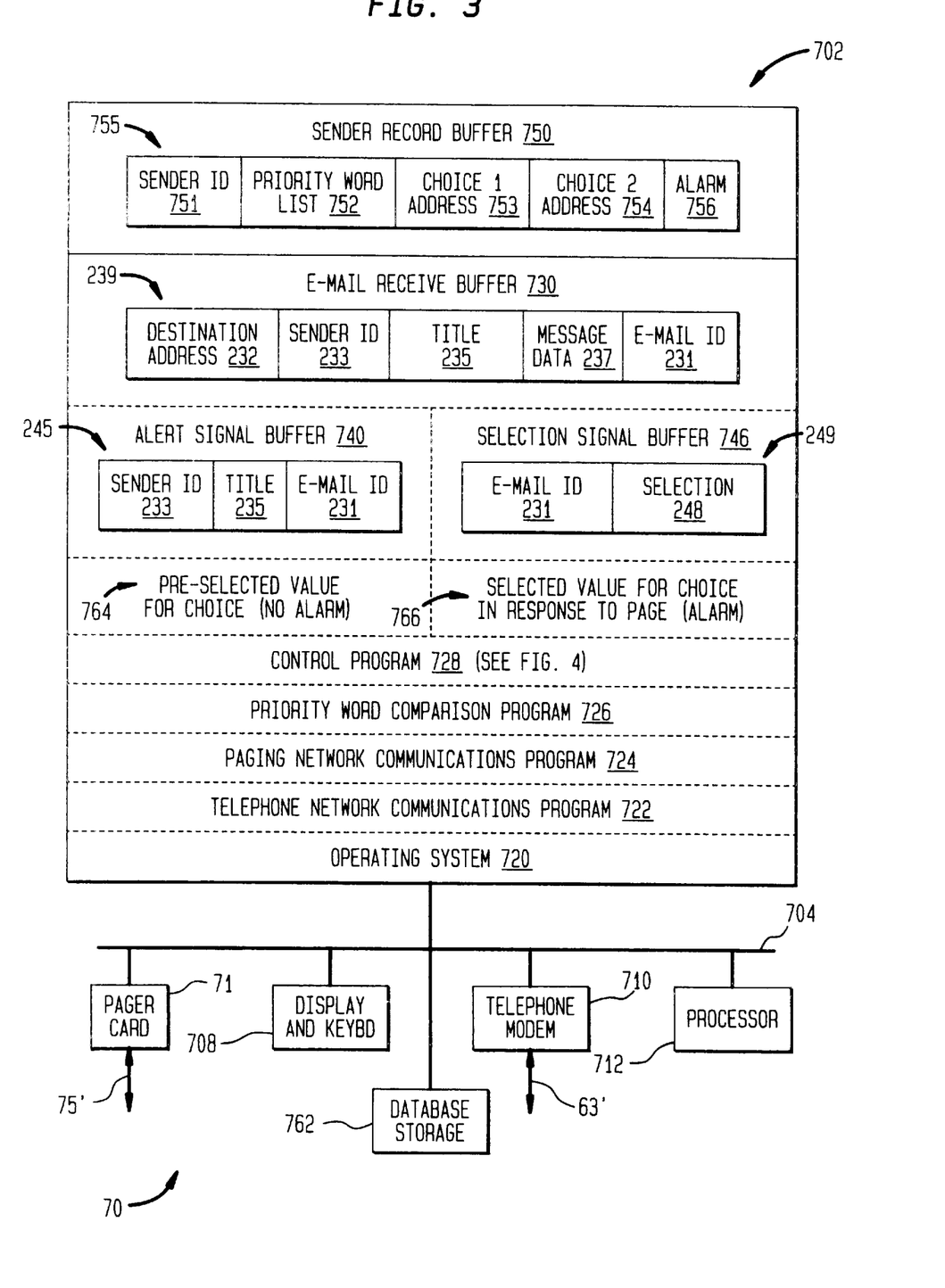
FIG. 3 shows the recipient's computer 70.
Figure 4:
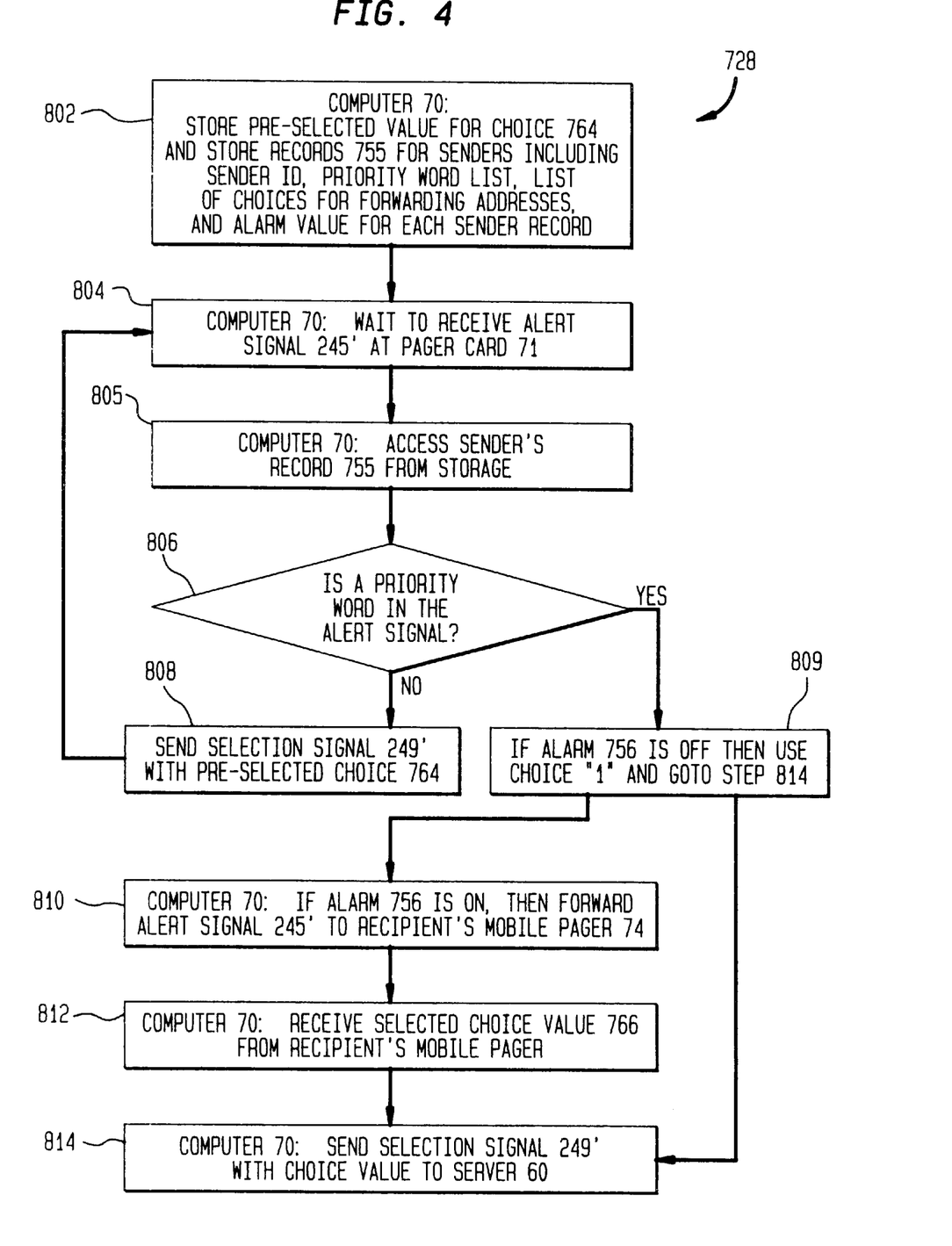
FIG. 4 shows the flow diagram of the control program 728 in the recipient's computer 70.

In accordance with the invention, the recipient's computer 70 automatically makes some of the E-Mail forwarding selections for the recipient. FIG. 3 shows the recipient's computer 70, which includes a local database 762 of sender records 755 for those senders whose messages are considered important to the recipient. FIG. 4 shows the flow diagram of the control program 728 in the recipient's computer 70, that automatically reviews the title or message summary in the alert signal 245' from the E-Mail server 60 and automatically sends to the E-Mail server 60 the selection signal 249' designating a selected forwarding destination to send the E-Mail message.

The Computer 70 is shown in greater detail in FIG. 3. Memory 702 is connected by the bus 704 to the wireless pager transceiver card 71, the display and keyboard 708, the telephone modem 710, the processor 712, and the database storage 762. The memory 702 includes an operating system program 720, a telephone network communications program 722, a paging network communications program 724, a priority word comparison program 726, and the control program 728 shown in FIG. 4. The programs are composed of executable instructions which, when executed by the processor 712, carry out the functions performed by the Computer 70. Memory 702 also includes a sender record buffer 750 which stores the sender record 755 accessed from the database storage 762. The record 755 is shown with the fields for sender ID 751, the priority word list 752, the choice_1 address 753, the choices_2 address 754, and the alarm 756. Memory 702 also includes an E-Mail receive buffer 730 which stores an E-Mail message 239 received from the E-Mail server 60. The message is shown with the fields for destination address 232, sender ID 233, title 235, message data 237, and E-Mail ID 231. Memory 702 also includes an alert signal buffer 740 with the alert signal 245' having fields 233, 235, and 231. Memory 702 also includes a selection signal buffer 746 with a selection signal 249' having fields 231 and 248. Memory 702 also includes a pre-selected value for choice (no alarm) 764. Memory 702 also includes a buffer 766 to store the selected value for choice in response to page (alarm).

In accordance with the invention, the Computer 70 is controlled by the control program 728 shown in FIG. 4. Step 802 stores the pre-selected value for choice 764 and the sender records 755. Each sender record 755 includes the sender's ID, a priority word list 752 of words that the recipient considers important in any messages sent by that particular sender, a list of choices 753 and 754 for forwarding addresses, and an alarm value 756 for each sender record. Step 804 waits to receive an alert signal 245' at pager card 71. When an alert signal is received, Step 805 accesses the sender's record 755 from the database storage 762. The recipient's computer 70 includes the priority word comparison program 726 to compare the words received in the alert signal 245' with the words in the priority word list 752 in the sender's record 755. Step 806 determines if a priority word is in the alert signal. If there is no match with a priority word, then step 808 has the recipient's computer 70 send a selection signal 249' to the server 60 with a pre-selected default choice 764 for the forwarding destination. However, if Step 806 determines that there is a match with a priority word, then the program passes to step 809. Step 809 determines if the alarm value 756 is off and if it is off, then the program uses choice_1 753 and goes to step 814. The recipient's computer 70 selects a first destination choice 753 from the sender's record 755 to send in the selection signal 249' to the E-Mail server 60.

If there is a match and Step 809 determines that the alarm value 756 is on, then the program passes to step 810. In Step 810, since an alarm value 756 is present in the sender's record 755, the computer 70 uses its wireless pager transceiver card 71 to send an alert signal 245' to the recipient's mobile pager 74. In this manner, the recipient can manually make the forwarding selection for particularly important E-Mail messages. Step 812 receives the selected choice value 766 from the recipient's mobile pager. Then step 814 sends the selection signal 249' with the choice value to the E-Mail server 60.

Figure 5:
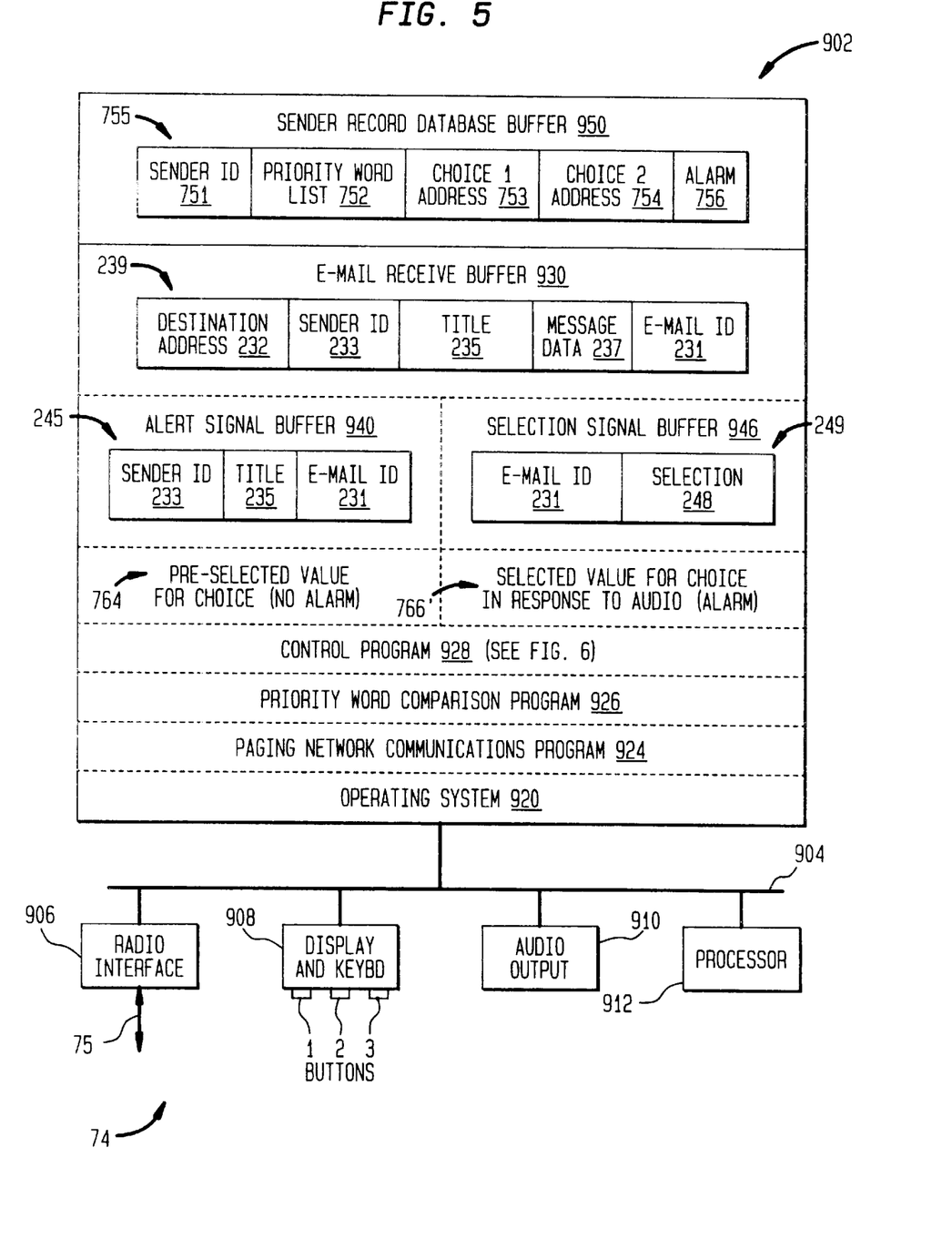
FIG. 5 shows the recipient's mobile pager 74.
Figure 6:
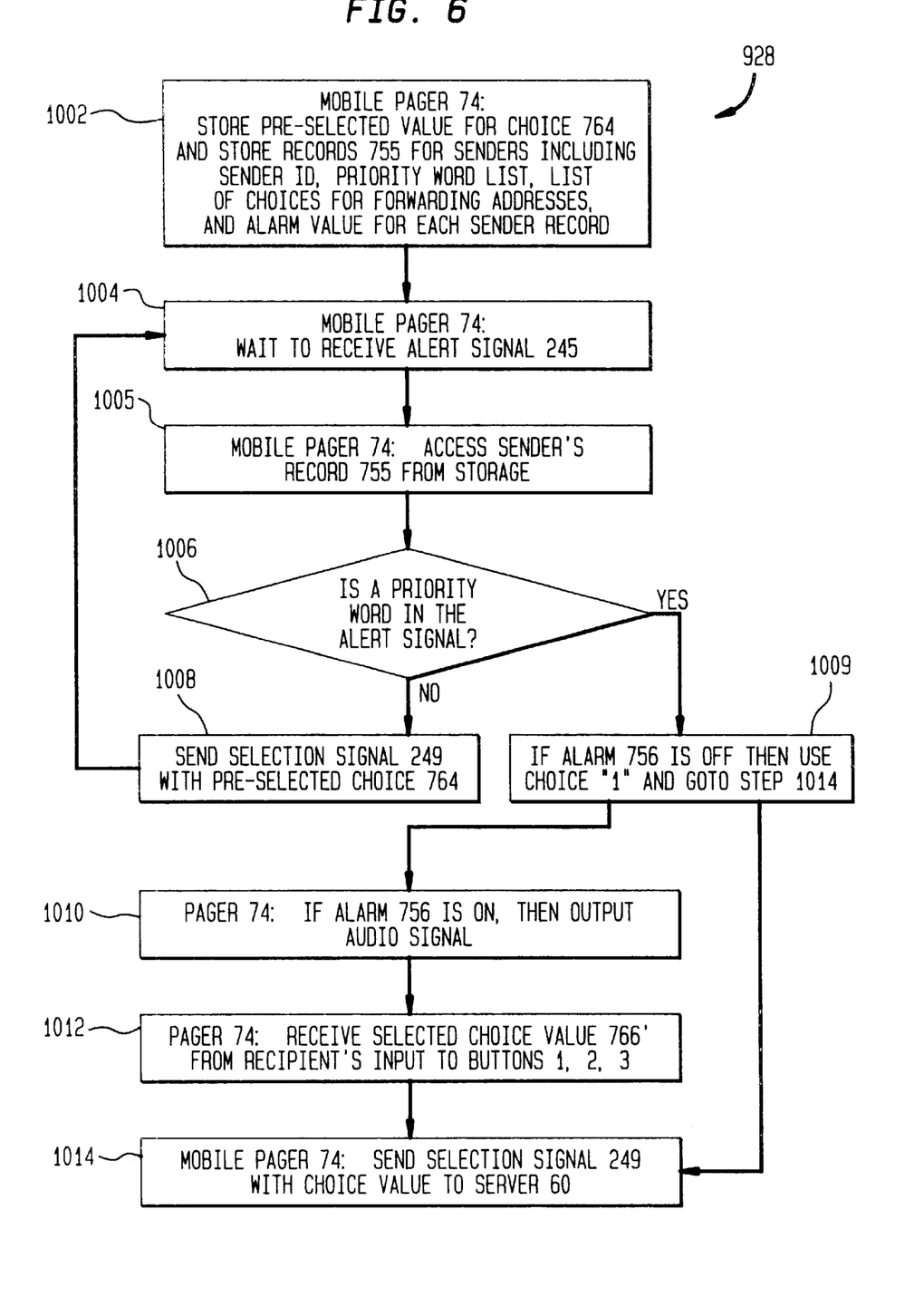
FIG. 6 shows the flow diagram of the control program 928 in the recipient's mobile pager 74.

In an alternate embodiment of the invention, the recipient's mobile pager or personal communications device carried by the recipient automatically makes some of the E-Mail forwarding selections for the recipient. FIG. 5 shows the recipient's mobile pager 74 which includes a local database in buffer 950 of sender records 755 for those senders whose messages are considered important to the recipient. FIG. 6 shows the flow diagram of the control program 928 in the recipient's mobile pager 74 that automatically reviews the title or message summary in the alert signal 245 from the E-Mail server 60 and automatically sends to the E-Mail server 60 the selection signal 249 designating a selected forwarding destination to send the E-Mail message.

The mobile pager 74 is shown in greater detail in FIG. 5. Memory 902 is connected by the bus 904 to the radio interface 906, the display and keyboard 908 with buttons 1, 2, and 3, the audio output 910, and the processor 912. The memory 902 includes an operating system program 920, a paging network communications program 924, a priority word comparison program 926, and the control program 928 shown in FIG. 10. The programs are composed of executable instructions which, when executed by the processor 912, carry out the functions performed by the mobile pager 74. Memory 902 also includes a sender record buffer 950 which stores all of the sender records 755. A record 755 is shown with the fields for sender ID 751, the priority word list 752, the choice_1 address 753, the choice_2 address 754, and the alarm 756. Memory 902 also includes an E-Mail receive buffer 930 which stores an E-Mail message 239 received from the E-Mail server 60. The message is shown with the fields for destination address 232, sender ID 233, title 235, message data 237, and E-Mail ID 231. Memory 902 also includes an alert signal buffer 940 with the alert signal 245 having fields 233, 235, and 231. Memory 902 also includes a selection signal buffer 946 with a selection signal 249 having fields 231 and 248. Memory 902 also includes a pre-selected value for choice (no alarm) 764. Memory 902 also includes a buffer 766' to store the selected value for choice in response to pressing button 1, 2, or 3 (alarm).

In accordance with the invention, the mobile pager 74 is controlled by the control program 928 shown in FIG. 6. Step 1002 stores the pre-selected value for choice 764 and the sender records 755 in memory 902. Each sender record 755 includes the sender's ID, a priority word list 752 of words that the recipient considers important in any messages sent by that particular sender, a list of choices 753 and 754 for forwarding addresses, and an alarm value 756 for each sender record. Step 1004 waits to receive an alert signal 245 at radio interface 906. When an alert signal is received, Step 1005 accesses the sender's record 755 from the memory 902. The recipient's mobile pager 74 includes the priority word comparison program 926 to compare the words received in the alert signal 245 with the words in the priority word list 752 in the sender's record 755. Step 1006 determines if a priority word is in the alert signal. If there is no match with a priority word, then step 1008 has the recipient's mobile pager 74 send a selection signal 249 to the server 60 with a pre-selected default choice 764 for the forwarding destination. However, if Step 1006 determines that there is a match with a priority word, then the program passes to step 1009. Step 1009 determines if the alarm value 756 is off and if it is off, then the program uses choice_1 753 and goes to step 1014. The recipient's mobile pager 74 selects a first destination choice 753 from the sender's record 755 to send in the selection signal 249 to the E-Mail server 60.

If there is a match and Step 1009 determines that the alarm value 756 is on, then the program passes to step 1010. In Step 1010, since an alarm value 756 is present in the sender's record 755, the mobile pager 74 outputs an audio signal on the audio output 910 to alert the recipient. In this manner, the recipient can manually make the forwarding selection for particularly important E-Mail messages. Step 1012 receives the selected choice value 766' from the recipient's pressing the buttons 1, 2, or 3 on the keyboard 908. Then Step 1014 sends the selection signal 249 with the choice value to the E-Mail server 60. If the recipient's choice is to view the entire E-Mail message on the display of the mobile pager 74 or personal communications device, the server 60 will transmit the entire E-Mail message over the radio link 75 to the mobile pager 74.

Although a specific embodiment of the invention has been disclosed, it will be understood by those having skill in the art the changes can be made to the specific embodiment without departing from the spirit and the scope of the invention.

What is claimed is:

1. A communications device for transmitting a selection value to an E-Mail server buffering an E-mail message received from an E-Mail network, to forward the E-Mail message to a selected forwarding destination, comprising:

a paging system coupled directly to the E-Mail server;

a personal computer that includes a wireless pager card coupled to the paging system via a radio link;

a data storage within said personal computer for storing a pre-selected default forwarding destination and a plurality of sender records, each record being for an E-Mail sender and including the E-Mail sender's identity, a priority word list of words, an alarm value that is either on or off, and a list of forwarding destinations, which includes a first forwarding destination, for an E-Mail message from the E-Mail server;

said wireless pager card receiving an alert signal from said paging system over said radio link, the alert signal including a received identity of a sender and a title and message summary including words;

a processor within said personal computer coupled to the storage and to the wireless pager card, for comparing the received identity of the sender with the sender identities in the plurality of sender records and comparing the words in the title and message summary with the words in the priority word list;

if there is no match between the words in the title and message summary and the words in the priority word list, said processor outputting said pre-selected default forwarding destination as said selected forwarding destination for the E-Mail message;

if there is a match between the words in the title and message summary and the words in the priority word list, and if said alarm value is off, said processor outputting said first forwarding destination in a sender record having a sender identity that matches the received sender identity as said selected forwarding destination for the E-Mail message;

if there is a match between the words in the title and message summary and the words in the priority word list, and if said alarm value is on, said processor outputting said list of forwarding destinations in a sender record having a sender identity that matches the received sender identity;

a display on said personal computer displaying said list of forwarding destinations;

a key on said personal computer whereby one of said list of forwarding destinations can be selected by depressing said key;

said wireless pager card sending a selection signal to said paging system over said radio link, wherein said selection signal includes a selection value that indicates said selected forwarding destination for the E-Mail message; and wherein said selection value is transferred to said E-Mail server.

2. In a communications device for transmitting a selection value to an E-Mail server buffering an E-Mail message received from an E-Mail network, to forward the E-Mail message to a selected forwarding destination, a method comprising the steps of:

storing a pre-selected default forwarding destination and a plurality of sender records in a pager, each record being for an E-Mail sender and including the E-Mail sender's identity, a priority word list of words, an alarm value that is either on or off, and a list of forwarding destinations, which includes a first forwarding destination, for an E-Mail message from the E-Mail server;

receiving an alert signal over a radio link from a paging system that is coupled directly to the E-Mail server, the alert signal including a received identity of a sender and a title and message summary including words;

comparing in the pager the received identity of the sender with the sender identities in the plurality of sender records and comparing in the pager the words in the title and message summary with the words in the priority word list;

if there is no match between the words in the title and message summary and the words in the priority word list, outputting said pre-selected default forwarding destination as said selected forwarding destination for the E-Mail message;

if there is a match between the words in the title and message summary and the words in the priority word list, and if said alarm value is off, outputting said first forwarding destination in a sender record having a sender identity that matches the received sender identity as said selected forwarding destination for the E-Mail message;

if there is a match between the words in the title and message summary and the words in the priority word list, and if said alarm value is on, (i) outputting said list of forwarding destinations in a sender record having a sender identity that matches the received sender identity, (ii) displaying said list of forwarding destinations on said pager, and (iii) selecting one of said list of forwarding destinations by depressing a button on said pager;

sending a selection signal to said pager system over said radio link, wherein said selection signal includes a selection value that indicates said selected forwarding destination for the E-Mail message; and transferring said selection value to said E-Mail server.

3. An article of manufacture for use in a computer system, comprising:

a computer useable medium having computer readable program code means embodied therein for transmitting a selection value to an E-Mail server buffering an E-Mail message received from an E-Mail network, to forward the E-mail message to a selected forwarding destination, the computer readable program code means in said article of manufacture comprising:

computer readable program code means for causing a computer to store a pre-selected default forwarding destination and a plurality of sender records, each record being for an E-Mail sender and including the E-Mail sender's identity, a priority word list of words, an alarm value that is either on or off, and a list of forwarding destinations, which includes a first forwarding destination, for an E-Mail message from the E-Mail server;

computer readable program code means for causing a computer to receive an alert signal over a radio link from a paging system coupled directly to the E-Mail server, the alert signal including a received identity of a sender and a title and message summary including words;

computer readable program code means for causing a computer to compare the received identity of the sender with the sender identities in the plurality of sender records and compare the words in the title and message summary with the words in the priority word list;

computer readable program code means for causing a computer to output said pre-selected default forwarding destination as said selected forwarding destination for the E-Mail message if there is no match between the words in the title and message summary and the words in the priority word list;

computer readable program code means for causing a computer to output said first forwarding destination in a sender record having a sender identity that matches the received sender identity as said selected forwarding destination for the E-Mail message if there is a match between the words in the title and message summary and the words in the priority word list, and if the alarm value is off;

computer readable program code means for causing a computer to output said list of forwarding destinations in a sender record having a sender identity that matches the received sender identity if there is a match between the words in the title and message summary and the words in the priority word list, and if the alarm value is on;

computer readable program code means for causing a computer to display said list of forwarding destinations;

computer readable program code means for causing a computer to respond to a key on the computer being depressed to select one of said list of forwarding destinations;

computer readable program code means for causing a computer to send a selection signal over said radio link to the paging system, wherein said selection signal includes a selection value that indicates said selected forwarding destination for the E-Mail message; and computer readable program code means for causing a computer to transfer said selection value to said E-Mail server.

4. A communications system, comprising:

a telecommunications transmission system;

an E-Mail server buffering an E-Mail message received from an E-Mail network while waiting for a recipient to select a forwarding destination in the telecommunications transmission system for the E-Mail message;

a paging system coupled directly to the E-Mail server;

a pager coupled to the paging system via a radio link;

a data storage within said pager for storing a pre-selected default forwarding destination and a plurality of sender records, each record being for an E-Mail sender and including the E-Mail sender's identity, a priority word list of words, an alarm value that is either on or off, and a list of forwarding destinations, which includes a first forwarding destination, in the telecommunications transmission system for an E-Mail message from the E-Mail server;

a receiver within said pager for receiving an alert signal over said radio link from said paging system, the alert signal including a received identity of a sender and a title and message summary including words;

a processor within said pager coupled to the storage and to the receiver, for comparing the received identity of the sender with the sender identities in the plurality of sender records and comparing the words in the title and message summary with the words in the priority list of words;

if there is no match between the words in the title and message summary and the words in the priority word list, said processor outputting said pre-selected default forwarding destination;

if there is a match between the words in the title and message summary and the words in the priority word list, and if the alarm value is off, said processor outputting said first forwarding destination in a sender record having a sender identity that matches the received sender identity;

if there is a match between the words in the title and message summary and the words in the priority word list, and if the alarm value is on, said processor outputting said list of forwarding destinations in a sender record having a sender identity that matches the received sender identity;

a display on said pager for displaying said list of forwarding destinations;

a button on said pager for selecting one of said list of forwarding destinations by depressing said button;

a transmitter within said pager coupled to the processor, for sending a selection signal to said paging system, wherein said selection signal includes a selection value that indicates said selected forwarding destination for the E-Mail message.

* * * * *